United States Patent
Kim et al.

(10) Patent No.: US 12,463,197 B2
(45) Date of Patent: *Nov. 4, 2025

(54) NEGATIVE ELECTRODE AND LITHIUM SECONDARY BATTERY

(71) Applicant: LG Energy Solution, Ltd., Seoul (KR)

(72) Inventors: Shulkee Kim, Daejeon (KR); Kyutae Park, Daejeon (KR); Cheoljin Oh, Daejeon (KR); Kwang Ho Yoo, Daejeon (KR); Gayoung Lim, Daejeon (KR); Wonhee Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/172,807

(22) Filed: Apr. 8, 2025

(65) Prior Publication Data

US 2025/0239588 A1    Jul. 24, 2025

Related U.S. Application Data

(63) Continuation of application No. 18/778,084, filed on Jul. 19, 2024.

(30) Foreign Application Priority Data

Jul. 28, 2023    (KR) .......................... 10-2023-009952

(51) Int. Cl.
| | |
|---|---|
| *H01M 4/133* | (2010.01) |
| *H01M 4/36* | (2006.01) |
| *H01M 4/48* | (2010.01) |
| *H01M 4/525* | (2010.01) |
| *H01M 4/587* | (2010.01) |
| *H01M 10/0525* | (2010.01) |
| *H01M 4/02* | (2006.01) |

(52) U.S. Cl.
CPC ........... *H01M 4/133* (2013.01); *H01M 4/364* (2013.01); *H01M 4/483* (2013.01); *H01M 4/525* (2013.01); *H01M 4/587* (2013.01); *H01M 10/0525* (2013.01); *H01M 2004/027* (2013.01); *H01M 2004/028* (2013.01)

(58) Field of Classification Search
CPC ...... H01M 4/133; H01M 4/364; H01M 4/483; H01M 4/525; H01M 4/587; H01M 10/0525; H01M 2004/027; H01M 2004/028

See application file for complete search history.

(56) References Cited

U.S. PATENT DOCUMENTS

| | | | |
|---|---|---|---|
| 10,263,242 B2 | 4/2019 | Ahn et al. | |
| 10,910,639 B2 | 2/2021 | Lee et al. | |
| 11,646,417 B2 | 5/2023 | Lv et al. | |
| 2021/0151744 A1 | 5/2021 | Choi et al. | |
| 2022/0140342 A1 | 5/2022 | Jeong et al. | |
| 2022/0149340 A1* | 5/2022 | Yao ...................... | H01M 4/587 |
| 2022/0367872 A1* | 11/2022 | Lv .......................... | H01M 4/366 |
| 2023/0089248 A1* | 3/2023 | Jeong .................... | H01M 4/133 |
| | | | 429/231.8 |

FOREIGN PATENT DOCUMENTS

| | | |
|---|---|---|
| CN | 116364859 A | 6/2023 |
| CN | 116387448 A | 7/2023 |
| JP | 2020095853 A | 6/2020 |
| JP | 2023503706 A | 1/2023 |
| KR | 20140095980 A | 8/2014 |
| KR | 20180040268 A | 4/2018 |
| KR | 20200047286 A | 5/2020 |
| KR | 20210054828 A | 5/2021 |
| KR | 20220012577 A | 2/2022 |
| KR | 20220057158 A | 5/2022 |
| KR | 20230017051 A | 2/2023 |

OTHER PUBLICATIONS

International Search Report for Application No. PCT/KR2024/010418 mailed Nov. 6, 2024, pp. 1-3. [See p. 2, categorizing the cited references].

* cited by examiner

*Primary Examiner* — Cynthia K Walls
(74) *Attorney, Agent, or Firm* — Lerner David LLP

(57) ABSTRACT

A negative electrode for a secondary battery includes a current collector and a negative electrode active material layer provided on at least one surface of the current collector. The negative electrode active material layer includes a first region corresponding to 50% of a total thickness of the negative electrode active material layer from a surface facing the current collector and a second region corresponding to 50% of the total thickness of the negative electrode active material layer from a surface opposite to the surface facing the current collector. The negative electrode active material layer includes two or more types of negative electrode active materials having D50 different from each other and satisfies the Equations 1 and 2. A secondary battery including the negative electrode is also provided.

20 Claims, No Drawings

NEGATIVE ELECTRODE AND LITHIUM SECONDARY BATTERY

CROSS-REFERENCE TO RELATED APPLICATIONS

This application is a continuation of U.S. application Ser. No. No. 18/778, 084 filed on Jul. 19, 2024, which claims priority to and the benefit of Korean Patent Application No. 10-2023-0099052 filed in the Korean Intellectual Property Office on Jul. 28, 2023, the entire content of which is incorporated herein by reference in its entirety for all purposes as if fully set forth herein.

TECHNICAL FIELD

The present disclosure relates to a negative electrode for a lithium secondary battery, and a lithium secondary battery including the same.

BACKGROUND ART

A secondary battery is universally applied not only to a portable device, but also to an electric vehicle (EV) or a hybrid electric vehicle (HEV) that is driven by an electrical driving source.

The secondary battery is attracting attention as a new energy source to improve eco-friendliness and energy efficiency because of the primary advantage that the use of fossil fuels can be dramatically reduced and the advantage that no by-products are generated from the use of energy.

In general, a secondary battery includes a positive electrode, a negative electrode, a separator interposed between the positive electrode and the negative electrode, an electrolyte, and the like. In addition, the electrode such as a positive electrode and a negative electrode may have an electrode active material layer provided on a current collector.

As utilization of the secondary battery increases, various battery performances are required. Therefore, attempts are being made to improve the material or structure of the active material layer in order to improve battery performance.

SUMMARY

The present disclosure has been made in an effort to provide a negative electrode for a lithium secondary battery that can provide a lithium secondary battery with improved life, and a lithium secondary battery including the same.

An example of the present disclosure provides a negative electrode for a lithium secondary battery including a current collector and a negative electrode active material layer provided on at least one surface of the current collector, wherein the negative electrode active material layer includes a first region corresponding to 50% of a total thickness of the negative electrode active material layer from a surface facing the current collector and a second region corresponding to 50% of the total thickness of the negative electrode active material layer from a surface opposite to the surface facing the current collector, and wherein the negative electrode active material layer includes two or more types of negative electrode active materials having $D_{50}$ different from each other and satisfies following Equations 1 and 2:

$$-3 \leq (|D_{50,total} - D_{50,1st}| \div D_{50,total} \times 100 \leq 3 \quad \text{[Equation 1]}$$

$$-3 \leq (|D_{50,total} - D_{50,2nd}| \div D_{50,total} \times 100 \leq 3 \quad \text{[Equation 2]}$$

In Equation 1 and Equation 2, $D_{50,total}$ is $D_{50}$ of the negative electrode active material in the entire negative electrode active material layer, $D_{50,1st}$ is $D_{50}$ of the negative electrode active material in the first region, and $D_{50,2nd}$ is $D_{50}$ of the negative electrode active material in the second region.

According to one example, the negative electrode active material includes a silicon-based active material, artificial graphite, and natural graphite.

According to another example, the negative electrode active material layer includes: a first negative electrode active material layer provided on the current collector; and a second negative electrode active material layer provided on the first negative electrode active material layer.

Another example of the present disclosure provides a secondary battery including the negative electrode for a lithium secondary battery, a positive electrode, and a separator.

According to the examples described in the present disclosure, a pore structure in the negative electrode active material layer can be optimized by controlling a particle size of the negative electrode active material. Accordingly, by optimizing the pore structure that serves as a material movement path in the negative electrode active material layer, it is possible to improve not only migration of lithium ions but also reactivity between the negative electrode and an electrolyte solution including lithium, realizing long life performance of the battery.

DETAILED DESCRIPTION

Hereinafter, the present disclosure will be described in more detail for better understanding of the present disclosure. The present disclosure may be implemented in various different forms, and is not limited to the examples described herein. The terms or words used throughout the disclosure and the claims should not be construed as being limited to their ordinary or dictionary meanings, but construed as having meanings and concepts consistent with the technical idea of the present disclosure, based on the principle that an inventor may properly define the concepts of the words or terms to best explain the technology.

It will be further understood that the terms "comprises", "includes" or "have" when used in the present disclosure specify the presence of stated features, integers, steps, constitutional elements and/or combinations thereof, but do not preclude the presence or addition of one or more other features, integers, steps, constitutional elements, and/or combinations thereof.

Further, it will be understood that when an element such as a layer is referred to as being "on" another element, it can be "directly on" the other element or an intervening element may also be present. In contrast, when an element is referred to as being "directly on" another element, there are no intervening elements present. Further, when an element is referred to as being "on" a reference portion, the element is positioned above or below the reference portion, and it does not necessarily mean that the element is positioned "above" or "on" in a direction opposite to gravity.

In the present disclosure, descriptions referred to only as "negative electrode active material layer" without first and second expressions may be applied to both the first and second negative electrode active material layers, unless otherwise specified.

In the present disclosure, the first region and the second region are divisions for checking the $D_{50}$ particle size distribution of the negative electrode active material on the basis of a thickness of the negative electrode active material layer, and does not mean that a physical interface exists between the two regions. As described below, two negative electrode active material layers may coincide with the first and second regions, and in some cases, an interface may exist between the negative electrode active material layers. However, even when the two negative electrode active material layers coincide with the first and second regions, the interface therebetween may not be distinguished.

A negative electrode for a secondary battery according to an example of the present disclosure includes a current collector and a negative electrode active material layer provided on at least one surface of the current collector, wherein the negative electrode active material layer includes a first region corresponding to 50% of a total thickness of the negative electrode active material layer from a surface facing the current collector, and a second region corresponding to 50% of the total thickness of the negative electrode active material layer from a surface opposite to the surface facing the current collector, and wherein the negative electrode active material layer includes two or more types of negative electrode active materials having $D_{50}$ different from each other and satisfies following Equations 1 and 2:

$$-3 \le (|D_{50,total} - D_{50,1st}| \div D_{50,total} \times 100 \le 3 \quad \text{[Equation 1]}$$

$$-3 \le (|D_{50,total} - D_{50,2nd}| \div D_{50,total} \times 100 \le 3 \quad \text{[Equation 2]}$$

In Equations 1 and 2, $D_{50,total}$ is $D_{50}$ of the negative electrode active material in the entire negative electrode active material layer, $D_{50,1st}$ is $D_{50}$ of the negative electrode active material in the first region, and $D_{50,2nd}$ is $D_{50}$ of the negative electrode active material in the second region.

According to the above example, even when the negative electrode active material layer includes three or more types of negative electrode active materials having $D_{50}$ different from each other and at least one of the first region or the second region includes two or more types of negative electrode active materials having $D_{50}$ different from each other, a pore structure in the negative electrode active material layer can be optimized by configuring the negative electrode active material layer to satisfy Equations 1 and 2 above. Thereby, it is possible not only to optimize migration of lithium ions in the negative electrode active material layer while maintaining a high energy density, but also to ensure long life performance of the battery by uniformly controlling a reaction in the negative electrode active material layer.

Equations 1 and 2 above indicate that a difference in particle size distribution of the negative electrode active material between each of the first region and the second region and the entire negative electrode active material layer is within 3%, and by satisfying Equations 1 and 2, the pore structure in the entire negative electrode active material layer can be designed uniformly. If a value of Equation 1 or Equation 2 is less than −3 or greater than 3, it indicates that the particle size distribution and pore structure of each region are heterogeneous from the particle size distribution and pore structure of the entire negative electrode active material layer. In this case, the mobility of lithium ions is inhibited, and there are parts with different reactivity in the negative electrode active material layer, which may adversely affect the life of the battery.

According to an example, a composition of the negative electrode active material in the first region and a composition of the negative electrode active material the second region are different. This may mean that a type of the negative electrode active material, a content ratio of the negative electrode active material, or both is not the same. For example, the fact that the composition of the negative electrode active materials are different includes a case where at least one type of the negative electrode active materials is different, a case where the types of the negative electrode active materials are the same but $D_{50}$ is different, and a case where the types of the negative electrode active materials are the same, $D_{50}$ is the same but contents of the negative electrode active materials are different. When the first and second regions satisfy Equations 1 and 2, they have similar pore structures due to uniform particle size distribution despite having different compositions.

According to an example, at least one of the first region or the second region includes two or more types of negative electrode active materials having $D_{50}$ different from each other.

According to an example, at least one of the first region or the second region includes three or more types of negative electrode active materials having $D_{50}$ different from each other.

According to an example, the first region and the second region include two or more types of negative electrode active materials having $D_{50}$ different from each other.

According to an example, the negative electrode active material layer has a structure of two or more layers. For example, the negative electrode active material layer includes a first negative electrode active material layer provided on the current collector; and a second negative electrode active material layer provided on the first negative electrode active material layer.

In the above example, a boundary between the first negative electrode active material layer and the second negative electrode active material layer may be the same as or different from a boundary between the first region and the second region. The fact that the boundary between the first negative electrode active material layer and the second negative electrode active material layer is the same as the boundary between the first region and the second region means that thicknesses of the two layers are the same.

According to an example, at least one of the first negative electrode active material layer or the second negative electrode active material layer includes two or more types of negative electrode active materials having $D_{50}$ different from each other and satisfies following Equations 3 and 4:

$$-3 \le (|D_{50,total} - D_{50,L1}| \div D_{50,total} \times 100 \le 3 \quad \text{[Equation 3]}$$

$$-3 \le (|D_{50,total} - D_{50,L2}| \div D_{50,total} \times 100 \le 3 \quad \text{[Equation 4]}$$

In Equations 3 and 4, $D_{50,total}$ is $D_{50}$ of the negative electrode active material in the entire negative electrode active material layer, $D_{50,L1}$ is $D_{50}$ of the negative electrode active material in the first negative electrode active material layer, and $D_{50,L2}$ is $D_{50}$ of the negative electrode active material in the second negative electrode active material layer.

Like Equations 1 and 2 described above, when Equations 3 and 4 are satisfied, the first and second negative electrode active material layers can have similar pore structures due to a uniform particle size distribution even when the first and second negative electrode active material layers include negative electrode active materials of different compositions.

According to an example, the negative electrode active material includes a first negative electrode active material, a second negative electrode active material, and a third negative electrode active material.

According to an example, the first negative electrode active material, the second negative electrode active material, and the third negative electrode active material may be the same as or different from each other and each may be artificial graphite, natural graphite, or a silicon-based active material.

According to an example, $D_{50}$ of the first negative electrode active material may be 15 μm to 25 μm, 18 μm to 25 μm, or 18 μm or greater and 22 μm or less.

According to an example, $D_{50}$ of the second negative electrode active material may be 10 μm to 20 μm, 12 μm to 18 μm, or 12 μm or greater and 16 μm or less.

According to an example, $D_{50}$ of the third negative electrode active material may be 2 μm to 15 μm, 3 μm to 12 μm, or 6 um or greater and 10 μm or less.

The particle size of the negative electrode active material may be adjusted depending on a material used during the manufacture thereof or a porous structure.

In an example, the silicon-based active material includes at least one selected from a group of a silicon oxide, silicon metal complex, and a silicon carbon composite. Specifically, the silicon-based active material includes at least one selected from a group of $SiO_x$ (0≤x<2), SiMy (M is a metal, 1≤y≤4), and Si/C. The silicon-based active material may include only one type, or two or more types together. In some examples, both the first and the second negative electrode active material layers may include silicon-based active materials, and the first and the second negative electrode active material layers may include the same type of silicon-based active material or different types or different combinations of silicon-based active materials.

According to an example, the first negative electrode active material layer includes at least one selected from a group of artificial graphite, natural graphite, and a silicon-based active material, and the second negative electrode active material layer includes at least one of artificial graphite or natural graphite. In this case, the second negative electrode active material layer may not include a silicon-based active material.

According to an example, the first negative electrode active material layer includes at least one of artificial graphite or natural graphite, and the second negative electrode active material layer includes at least one of artificial graphite, or natural graphite, and a silicon-based active material. In this case, the first negative electrode active material layer may not include a silicon-based active material.

According to an example, the first and second negative electrode active material layers include a silicon-based active material. In this case, the first and second negative electrode active material layers may further include at least one of artificial graphite or natural graphite.

When the negative electrode active material layer includes a silicon-based active material, the negative electrode active material layer may include 1 part by weight to 10 parts by weight of the silicon-based active material based on 100 parts by weight of the total negative electrode active material. In addition, when at least one of the first negative electrode active material layer or the second negative electrode active material layer includes a silicon-based active material, it may include 1 part by weight to 20 parts by weight of the silicon-based active material based on 100 parts by weight of the total negative electrode active materials of each layer.

In an example of the present disclosure, the negative electrode active material layer including the silicon-based active material may further include a carbon-based active material. In this case, the carbon-based active material material. may include at least one of artificial graphite or natural graphite. The carbon-based active material may be included in an amount of 90 parts by weight or more and 99 parts by weight or less on the basis of 100 parts by weight of a total of the negative electrode active material included in the negative electrode active material layer.

The active material including $SiO_x$ (0≤x<2) as the silicon-based active material may be a silicon-based composite particle including $SiO_x$ (0<x<2) and a pore.

The $SiO_x$ (0<x<2) corresponds to a matrix in the silicon-based composite particle. The $SiO_x$ (0<x<2) may be a form of including Si and $SiO_2$, and the Si may form a phase. That is, x corresponds to a ratio of the number of O to Si included in the $SiO_x$ (0<x<2). When the silicon-based composite particle includes the $SiO_x$ (0<x<2), a discharge capacity of a secondary battery can be improved.

The silicon-based composite particle may further include at least one of an Mg compound or a Li compound. The Mg compound and the Li compound may correspond to a matrix in the silicon-based composite particle.

The Mg compound and/or the Li compound may be present in the $SiO_x$ (0<x<2) and/or on a surface of the $SiO_x$ (0<x<2). The initial efficiency of the battery can be improved by the Mg compound and/or the Li compound.

The Mg compound may include at least one selected from a group including Mg silicate, Mg silicide, or Mg oxide. The Mg silicate may include at least one of $Mg_2SiO_4$ or $MgSiO_3$. The Mg silicide may include $Mg_2Si$. The Mg oxide may include MgO.

In an example of the present disclosure, the Mg element may be included in an amount of 0.1 wt % to 20 wt % or 0.1 wt % to 10 wt % based on 100 wt % of the total silicon-based active material. Specifically, the Mg element may be included in an amount of 0.5 wt % to 8 wt % or 0.8 wt % to 4 wt %. When the above range is satisfied, the Mg compound can be included in an appropriate content in the silicon-based active material, so the volume change of the silicon-based active material during charging and discharging of the battery can be easily suppressed, and the discharge capacity and initial efficiency of the battery can be improved.

The Li compound may include at least one selected from the group including Li silicate, Li silicide, or Li oxide. The Li silicate may include at least one selected from a group of $Li_2SiP_3$, $Li_4SiO_4$ or $Li_2Si_2O_5$. The Li silicide may include $Li_2Si_2$. The Li oxide may include $Li_2O$.

In an example of the present disclosure, the Li compound may include a form of lithium silicate. The lithium silicate is represented by $Li_aSi_bO_c$ (2≤a≤4, 0<b≤2, 2≤c≤5) and may be divided into crystalline lithium silicate and amorphous lithium silicate. The crystalline lithium silicate may be present in the silicon-based composite particle in a form of at least one lithium silicate selected from the group including $Li_2SiO_3$, $Li_gSiO_4$ or $Li_2Si_2O_5$, and the amorphous lithium silicate may be a form of $Li_aSi_bO_c$ ($2 \leq a \leq 4$, $0 < b \leq 2$, $2 \leq c \leq 5$). However, the present disclosure is not limited thereto.

In an example of the present disclosure, the Li element may be included in an amount of 0.1 wt % to 20 wt % or 0.1 wt % to 10 wt % based on 100 wt % of the total silicon-based active material. In other examples, the Li element may be included in an amount of 0.5 wt % to 8 wt %, and in some other examples, the Li element may be included in an amount of 0.5 wt % to 4 wt %. When the above ranges are satisfied, the Li compound may be included in an appropriate content in the silicon-based active material, so the volume change of the negative electrode active material during charging and discharging of the battery can be easily suppressed, and the discharge capacity and initial efficiency of the battery can be improved.

The content of the Mg element and Li element can be confirmed through ICP analysis. For the ICP analysis, a predetermined amount (about 0.01 g) of a negative electrode active material is precisely aliquoted, transferred to a platinum crucible, and completely decomposed on a hot plate by adding nitric acid, hydrofluoric acid and sulfuric acid thereto. Then, by using an inductively coupled plasma atomic emission spectrometer (ICP-AES, Perkin-Elmer 7300), a reference calibration curve is obtained by measuring the intensity of a standard liquid, which has been prepared using a standard solution (5 mg/kg), at an intrinsic wavelength of the Mg element or Li element. Subsequently, a pre-treated sample solution and a blank sample are introduced into the spectrometer, and by measuring the intensity of each component to calculate an actual intensity, calculating the concentration of each component based on the obtained calibration curve, and performing a conversion such that the sum of the calculated concentrations of the components is equal to a theoretical value, the Mg element or Li element content in the prepared silicon-based active material can be analyzed.

In an example of the present disclosure, a carbon layer may be provided on a surface of the silicon-based composite particle and/or inside the pore. Conductivity is imparted to the silicon-based composite particle by the carbon layer, so that the initial efficiency, life characteristics, and battery capacity characteristics of a secondary battery including the negative electrode active material including the silicon-based composite particle can be improved. A total amount of the carbon layer included may be 5 wt % to 40 wt % based on 100 wt % of the total silicon-based composite particle.

In an example of the present disclosure, the carbon layer may include at least one of amorphous carbon or crystalline carbon.

An average particle diameter ($D_{50}$) of the silicon-based composite particle may be 2 μm to 15 μm, specifically 3 μm to 12 μm, and more specifically 6 μm to 10 μm. When the above range is satisfied, a side reaction between the silicon-based composite particle and the electrolyte solution is controlled, and the discharge capacity and initial efficiency of the battery can be effectively implemented.

In the present disclosure, the average particle diameter ($D_{50}$) may be defined as a particle diameter corresponding to 50% of the cumulative volume in the particle diameter distribution curve of particles. The average particle diameter ($D_{50}$) may be measured using, for example, a laser diffraction method. In the laser diffraction method, in general, particle diameters ranging from a submicron range to several millimeters can be measured, and results with high reproducibility and high resolvability can be obtained.

The active material including Si/C as the silicon-based active material is a composite of Si and C, and is distinguished from silicon carbide denoted as SiC. The silicon carbon composite may be a composite of silicon, graphite, etc., and may form a structure in which a core composite of silicon, graphite, etc. is surrounded by graphene, amorphous carbon or the like. In the silicon carbon composite, silicon may be nano silicon. An average particle diameter ($D_{50}$) of the active material including the Si/C may be 2 μm to 15 μm, specifically 3 μm to 12 μm, and more specifically 6 μm to 10 μm. A carbon layer may be provided on a surface of the active material including Si/C.

In an example of the present disclosure, the negative electrode active material in 100 parts by weight of the negative electrode active material layer may be included in an amount of 80 parts by weight or more and 99.9 parts by weight or less, 90 parts by weight or more and 99.9 parts by weight or less, 95 parts by weight or more and 99.9 parts by weight or less, or 98 parts by weight or more and 99.9 parts by weight or less.

According to an additional example of the present disclosure, the negative electrode active material layer may further include a negative electrode binder, in addition to the negative electrode active material.

The negative electrode binder may serve to improve adhesion between particles of the negative electrode active material and adhesive force between particles of the negative electrode active material and the negative electrode current collector. For the negative electrode binder, those known in the art may be used. Non-limiting examples thereof may include at least one selected from the group including polyvinylidenefluoride-hexafluoropropylene copolymer (PVDF-CO-HFP), polyvinylidenefluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluoro rubber, poly acrylic acid, or the above-mentioned materials in which a hydrogen is substituted with Li, Na, Ca, etc., and may also include various copolymers thereof.

The negative electrode binder may be included in an amount of 0.1 part by weight or more and 20 parts by weight or less, for example, 0.3 part by weight or more and 20 parts by weight or less, or 0.5 part by weight or more and 10 parts by weight or less based on 100 parts by weight of the negative electrode active material layer.

The negative electrode active material layer may not include a conductive material, but may further include a conductive material if necessary. The conductive material included in the negative electrode active material layer is not particularly limited as long as it has conductivity without causing a chemical change in the battery, and for example, graphite such as natural graphite or artificial graphite; carbon black such as acetylene black, Ketjen black, channel black, furnace black, lamp black, and thermal black; a conductive fiber such as a carbon fiber and a metal fiber; a conductive tube such as a carbon nanotube; metal powders such as fluorocarbon, a aluminum, and nickel powders; conductive whisker such as zinc oxide and potassium titanate; a conductive metal oxide such as titanium oxide; a conductive material such as polyphenylene derivative, and the like may be used. A content of the conductive material in the negative electrode active material layer may be 0.01 part by weight to 20 parts by weight, or 0.03 part by weight to 18 parts by weight based on 100 parts by weight of the negative electrode active material layer.

In an example of the present disclosure, a thickness of each of the first and second negative electrode active material layers may be 30 μm or greater and 100 μm or less, for example, 45 μm or greater and 75 μm or less. A sum of the thicknesses of the first and second negative electrode active material layers may be 90 μm or greater and 150 μm or less.

In an example of the present disclosure, the negative electrode current collector is not particularly limited as long as it has conductivity without causing a chemical change in the battery. For example, for the current collector, copper, stainless steel, aluminum, nickel, titanium, fired carbon, aluminum or stainless steel each surface-treated with carbon, nickel, titanium, silver, or the like, or the like may be used. Specifically, transition metals that adsorb carbon well, such as copper and nickel, may be used for the current collector. A thickness of the current collector may be 1 μm to 500 μm. However, the thickness of the current collector is not limited thereto.

An additional example of the present disclosure provides a secondary battery including the negative electrode according to the above-described examples, a positive electrode, and a separator.

In an example of the present disclosure, the positive electrode may include a positive electrode current collector and a positive electrode active material layer formed on the positive electrode current collector and including the positive electrode active material. A thickness of the positive electrode active material layer may be 20 μm or greater and 500 μm or less.

The positive electrode current collector is not particularly limited as long as it has conductivity without causing a chemical change in the battery. For example, stainless steel, aluminum, nickel, titanium, fired carbon, aluminum or stainless steel each surface-treated with carbon, nickel, titanium, silver, or the like, or the like may be used. In addition, the positive electrode current collector may typically have a thickness of 1 to 500 μm, and a surface of the current collector may be formed with microscopic irregularities to enhance adhesive force of the positive electrode material. For example, the positive electrode current collector may be used in various forms such as a film, a sheet, a foil, a net, a porous body, a foamed body, and a non-woven fabric body.

In an example of the present disclosure, the positive electrode may include a lithium composite transition metal compound including nickel (Ni) and cobalt (Co), as an active material. The lithium composite transition metal compound may further include at least one of manganese or aluminum. The lithium composite transition metal compound may include 60 mol % or more, 80 mol % or more, for example, 80 mol % or more and less than 100 mol % of nickel among metals other than lithium.

In an example, the positive electrode active material in 100 parts by weight of the positive electrode active material layer may be included in an amount of 80 parts by weight or more and 99.9 parts by weight or less, 90 parts by weight or more and 99.9 parts by weight or less, 95 parts by weight or more and 99.9 parts by weight or less, or 98 parts by weight or more and 99.9 parts by weight or less.

According to a further example of the present disclosure, the positive electrode active material layer according to the example described above may further include a positive electrode binder and a conductive material.

The positive electrode binder may serve to improve adhesion between particles of the positive electrode active material and adhesive force between particles of the positive electrode active material and the positive electrode current collector. For the positive electrode binder, those known in the art may be used. Non-limiting examples thereof may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, various copolymers thereof, and the like, and any one thereof or a mixture of two or more thereof may be used.

The positive electrode binder may be included in an amount of 0.1 part by weight or more and 50 parts by weight or less, for example, 0.3 part by weight or more and 35 parts by weight or less, or 0.5 part by weight or more and 20 parts by weight or less on based on 100 parts by weight of the positive electrode active material layer.

The conductive material included in the positive electrode active material layer is used to impart conductivity to the electrode, and can be used without particular limitation as long as the conductive material has electronic conductivity without causing a chemical change in a battery. Specific examples may include graphite such as natural graphite and artificial graphite; a carbon-based material such as carbon black, acetylene black, Ketjen black, channel black, furnace black, lamp black, thermal black, carbon fiber and carbon nanotube; metal powders or metal fibers such as copper, nickel, aluminum and silver; a conductive whisker such as zinc oxide and potassium titanate; a conductive metal oxide such as titanium oxide; or a conductive polymer such as polyphenylene derivative, or the like, and any one thereof or a mixture of two or more thereof may be used. Specifically, in an example, the conductive material may include one or more of a single-walled carbon nanotube (SWCNT); and a multi-walled carbon nanotube (MWCNT).

The conductive material may be included in an amount of 0.1 part by weight or more and 10 parts by weight or less, for example, 0.1 part by weight or more and 7 parts by weight or less, or 0.1 part by weight or more and 5 parts by weight or less based on 100 parts by weight of a composition for the positive electrode active material layer.

According to an example, a sum of the weights of the first and second negative electrode active material layers of the negative electrode may be 170 to 280 mg/25 cm$^2$. Here, the weight is a value based on a weight (solid content) after drying, excluding a solvent. This range is advantageous for high energy density and rapid charging characteristics.

The positive electrode and the negative electrode can be manufactured according to a conventional method for manufacturing a positive electrode and a negative electrode, except using the positive and negative electrode active materials described above. Specifically, the electrode can be manufactured by applying a composition for active material layer formation, including the above-described active material and, optionally, a binder and a conductive material, onto a current collector, followed by drying and rolling. In this case, the types and contents of the positive and negative electrode active materials, the binder, and the conductive material are as described above. The solvent may be a solvent commonly used in the art, such as dimethyl sulfoxide (DMSO), isopropyl alcohol, N-methylpyrrolidone (NMP), acetone, or water, and any one thereof or a mixture of two or more thereof may be used. A used amount of the solvent is sufficient if it can dissolve or disperse the active material, the conductive material, and the binder in consideration of an applied thickness of a slurry and a manufacturing yield, and then, allows for a viscosity capable of exhibiting excellent thickness uniformity when applied to manufacture a positive electrode and a negative electrode. Alternatively, the positive electrode and the negative electrode may be manufactured by laminating, on a current collector, a film obtained by casting the composition for active material layer formation on a separate support and peeling off it from the support.

The separator serves to separate the negative electrode and the positive electrode and to provide a migration path of lithium ions, in which any separator may be used as the separator without particular limitation as long as it is typically used in a secondary battery, and particularly, a separator having high moisture-retention ability for an electrolyte solution as well as a low resistance against migration of electrolyte ions may be used.

Specifically, a porous polymer film, for example, a porous polymer film manufactured from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a usual porous non-woven fabric, for example, a non-woven fabric formed of high melting point glass fibers, polyethylene terephthalate fibers, or the like may be used. Furthermore, a coated separator including a ceramic component or a polymer material may be used to secure heat resistance or mechanical strength, and the separator having a single layer or multilayer structure may be selectively used.

Examples of the electrolyte may include an organic-based liquid electrolyte, an inorganic-based liquid electrolyte, a solid polymer electrolyte, a gel-type polymer electrolyte, a solid inorganic electrolyte, or a molten-type inorganic electrolyte that may be used when manufacturing a lithium secondary battery, but are not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimetoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, or ethyl propionate may be used. Among the carbonate-based organic solvents, ethylene carbonate and propylene carbonate, which cyclic carbonates, are high-viscosity organic solvents and can be used because they have high permittivity to dissociate a lithium salt well. When the cyclic carbonate is mixed with a linear carbonate with low viscosity and low permittivity, such as dimethyl carbonate or diethyl carbonate, in a suitable ratio and used, an electrolyte having high electric conductivity may be prepared, and therefore, may be used.

A lithium salt may be used as the metal salt, and the lithium salt is a material that is readily soluble in the non-aqueous electrolyte solution, in which, for example, one or more species selected from the group including $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ or $(CF_3CF_2SO_2)_2N^-$ may be used as an anion of the lithium salt.

One or more additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, may be further included in the electrolyte for the purpose of improving life characteristics of the battery, suppressing a decrease in battery capacity, improving discharge capacity of the battery, and the like, in addition to the above-described electrolyte components.

The secondary battery according to an example of the present disclosure includes an assembly including a positive electrode, a negative electrode, a separator, and an electrolyte, and may be a lithium secondary battery.

A further example of the present disclosure provides a battery module including the secondary battery as a unit cell, and a battery pack including the battery module. Since the battery module and the battery pack include the secondary battery having high capacity, high-rate capability, and high cycle characteristics, the battery module and the battery pack may be used as a power source of a medium to large sized device including an electric vehicle, a hybrid electric vehicle, a plug-in hybrid electric vehicle, or a power storage system, but not limited thereto.

Since the secondary battery according to the examples of the present disclosure stably exhibits excellent discharge capacity, output characteristics, and cycle performance, the secondary battery can be used as a power source of a portable device such as a mobile phone, a laptop computer, and a digital camera as well as a medium to large sized device including an electric vehicle, a hybrid electric vehicle, a plug-in hybrid electric vehicle or a power storage system. For example, the battery module or battery pack may be used as a power source of a medium to large sized device of any one or more of a power tool; an electric vehicle including an electric vehicle (EV), a hybrid electric vehicle, and a plug-in hybrid electric vehicle (PHEV); or a power storage system.

Hereinafter, examples will be provided for better understanding of the present disclosure. It will be apparent to one skilled in the art that the examples are only provided to illustrate the present disclosure and various modifications and alterations are possible within the scope and technical spirit of the present disclosure. Such modifications and alterations naturally fall within the scope of claims included herein.

EXAMPLES

Preparation of Cell

Example 1

Preparation of Positive Electrode

A positive electrode slurry (the solid content of the positive electrode slurry was included in an amount of 70 parts by weight with respect to the total positive electrode slurry) was prepared by adding an aluminum (Al)-doped lithium composite transition metal compound including nickel (Ni), cobalt (Co), and manganese (Mn) at an atomic ratio of 84:8:8, as a positive electrode active material, a conductive material (CNT), and a binder (PVDF) to a solvent of methylpyrrolidone (NMP) at a weight ratio of 97:1:2.

A positive electrode was prepared by applying the positive electrode slurry prepared above onto an Al current collector, followed by drying and then roll-pressing at room temperature.

Preparation of Negative Electrode

For a first negative electrode active material layer, a negative electrode slurry (the solid content of the negative electrode slurry was included in an amount of 50 parts by weight with respect to the total negative electrode slurry) was prepared by adding a carbon-based active material (including artificial graphite and natural graphite at a weight ratio of 4:6), a conductive material (carbon black), a binder (SBR) and a thickener (Li-CMC) to a distilled water solvent at a weight ratio of 96:1:2:1.

For a second negative electrode active material layer, a negative electrode slurry (the solid content of the negative electrode slurry was included in an amount of 50 parts by weight with respect to the total negative electrode slurry) was prepared by adding a negative electrode active material including an Mg-doped SiO active material and a carbon-based active material (including only natural graphite) (the Mg-doped SiO active material was included in an amount of 5 parts by weight based on 100 parts by weight of the total negative electrode active material (10 parts by weight based on 100 parts by weight of the negative electrode active material in the second negative electrode active material layer), a conductive material (carbon black), a binder (SBR), and a thickener (Li-CMC) to a distilled water solvent at a weight ratio of 96:1:2:1.

$D_{50}$ of the above natural graphite is 18 μm, and $D_{50}$ of the artificial graphite is 16 μm, and $D_{50}$ of the Mg-doped SiO active material is 6 μm.

A negative electrode was prepared by applying sequentially the first negative electrode active material layer slurry prepared above onto a Cu current collector and the second negative electrode active material layer slurry onto the first negative electrode active material layer, followed by drying and then roll-pressing at room temperature.

Preparation of Cell

A cell was prepared by interposing and assembling a separator between the positive electrode and the negative electrode prepared above, injecting an electrolyte solution, and then activating it.

Composition of electrolyte solution: 1M $LiPF_6$, ethylene carbonate (EC)/ethylmethyl carbonate (EMC) (volume ratio 3/7), vinylene carbonate (VC)/propane sultone (PS) (included in the electrolyte by 3 parts by weight and 1.5 parts by weight, respectively)

Activation: charging at 0.1C for 3 hrs., then aging at high temperature/room temperature, and then degas Example 2

Electrodes and a cell were prepared in the same manner as in Example 1, except that the first negative electrode active material layer included artificial graphite, natural graphite, and Mg-doped SiO at a weight ratio of 40:55:5, and the second negative electrode active material layer included natural graphite and Mg-doped SiO at a weight ratio of 95:5.

Comparative Example 1

Electrodes and a cell were prepared in the same manner as in Example 1, except that the first negative electrode active material layer included artificial graphite and Mg-doped SiO at a weight ratio of 40:60 and the second negative electrode active material layer included natural graphite whose $D_{50}$ was 9 μm and Mg-doped SiO at a weight ratio of 90:10.

Comparative Example 2

Electrodes and a cell were prepared in the same manner as in Example 1, except that the first negative electrode active material layer included artificial graphite and Mg-doped SiO at a weight ratio of 40:60 and the second negative electrode active material layer included natural graphite and Mg-doped SiO at a weight ratio of 90:10.

The values of Equations 1 and 2 for the negative electrodes prepared in Examples 1 and 2 and Comparative Examples 1 and 2 are listed in Table 1 below.

TABLE 1

|  | Equation 1 | Equation 2 |
| --- | --- | --- |
| Example 1 | −2.44 | +2.44 |
| Example 2 | −2.38 | +2.38 |
| Comparative Example 1 | +5.08 | −5.08 |
| Comparative Example 2 | −6.19 | +6.19 |

Experimental Example 1. Room Temperature (25° C.) Cycle Performance

The prepared cells were subjected to cycle of constant current/constant voltage (CC/CV) charging (0.05C-cut) to 4.2V at 0.33C and constant current (CC) discharging at 0.33C (2.8V-cut) at room temperature (25°° C.). After 200 cycles, the discharge capacity was measured. Then, after charging as described above, an SOC of 50% was set with 0.33C discharging, and the capacity retention rate (capacity after 200 cycles/initial capacity×100%) was measured by discharging the cell with a pulse at 2.5C for 10 seconds to measure a resistance. The results are shown in Table 2 below.

Experimental Example 2. High Temperature Cycle Performance

The prepared cells were subjected to cycle of constant current/constant voltage (CC/CV) charging (0.05C-cut) to 4.2V at 0.33C and constant current (CC) discharging at 0.33C (2.5V-cut) at high temperature (45°° C.). After the 200 cycles, the capacity retention rate (capacity after 200 cycles/ initial capacity×100%) was measured by measuring the capacity in the same manner as in Experimental Example 1. The results are shown in Table 2 below.

TABLE 2

|  | Room temperature cycle life performance (%, @200 cycles) | High temperature cycle life performance (%, @200 cycles) |
| --- | --- | --- |
| Example 1 | 97 | 96 |
| Example 2 | 97 | 94 |
| Comparative Example 1 | 93 | 90 |
| Comparative Example 2 | 95 | 91 |

As shown in Table 1, in Examples 1 and 2, the difference in particle size distribution of the negative electrode active material between each of the first region and the second region and the entire negative electrode active material layer is within 3%.

As can be seen from the results of Examples 1 and 2 in Table 2, the batteries including the negative electrodes satisfying Equations 1 and 2 showed excellent capacity retention rates in room temperature cycle life performance and high temperature cycle life performance.

On the other hand, as in Comparative Examples 1 and 2, the batteries that do not satisfy the range of Equations 1 and 2 showed the capacity retention rates of early to middle 90 when measuring room temperature cycle life performance, and the capacity retention rates of early 90 when measuring high temperature cycle life performance. This is because if the average particle size of each region of the negative electrode active material layer is non-uniform, the mobility of lithium ions is inhibited, which causes an uneven reaction between the active materials in the negative electrode and adversely affects the life of the battery.

What is claimed is:

1. A negative electrode for a lithium secondary battery comprising:
   a current collector and a negative electrode active material layer provided on at least one surface of the current collector, wherein:
   the negative electrode active material layer comprises a first region corresponding to 50% of a total thickness of the negative electrode active material layer from a surface facing the current collector and a second region corresponding to 50% of the total thickness of the negative electrode active material layer from a surface opposite to the surface facing the current collector;
   a composition of a negative electrode active material in the first region and a composition of a negative electrode active material in the second region are different; and
   the negative electrode active material layer comprises two or more chemical types of negative electrode active materials having D50 different from each other and satisfies following Equations 1 and 2:

$$-3 \leq (|D50, \text{total} - D50, 1st| \div D50, \text{total} \times 100) \leq 3 \quad (1)$$

$$-3 \leq (|D50, \text{total} - D50, 2nd| \div DS0, \text{total} \times 100) \leq 3, \quad (2)$$

wherein:
   D50, total is D50 of the two or more chemical types of the negative electrode active materials in the negative electrode active material layer, D50,1st is D50 of the negative electrode active material in the first region, and D50,2nd is D50 of the negative electrode active material in the second region.

2. The negative electrode for a lithium secondary battery of claim 1, wherein the negative electrode active material layer comprises three or more chemical types of negative electrode active materials having D50 different from each other.

3. The negative electrode for a lithium secondary battery of claim 1, wherein at least one of the first region or the second region comprises two or more chemical types of negative electrode active materials having D50 different from each other.

4. The negative electrode for a lithium secondary battery of claim 1, wherein the first region and the second region comprise two or more chemical types of negative electrode active materials having D50 different from each other.

5. The negative electrode for a lithium secondary battery of claim 1, wherein the negative electrode active material layer has a structure of two or more layers.

6. The negative electrode for a lithium secondary battery of claim 1, wherein the negative electrode active material layer comprises:
   a first negative electrode active material layer provided on the current collector; and
   a second negative electrode active material layer provided on the first negative electrode active material layer.

7. The negative electrode for a lithium secondary battery of claim 6, wherein at least one of the first negative electrode active material layer or the second negative electrode active material layer comprises two or more chemical types of negative electrode active materials having D50 different from each other and satisfies following Equations 3 and 4:

$$-3 \leq (|D50, \text{total} - D50, 1st| \div D50, \text{total} \times 100) \leq 3 \quad (3)$$

$$-3 \leq (|D50, \text{total} - D50, 2nd| \div DS0, \text{total} \times 100) \leq 3, \quad (4)$$

wherein
   D50,total is D50 of the two or more chemical types of the negative electrode active materials in the negative electrode active material layer, D50,L1 is D50 of the negative electrode active material in the first negative electrode active material layer, and D50,L2 is D50 of the negative electrode active material in the second negative electrode active material layer.

8. The negative electrode for a lithium secondary battery of claim 6, wherein a boundary between the first negative electrode active material layer and the second negative electrode active material layer is different from a boundary between the first region and the second region.

9. The negative electrode for a lithium secondary battery of claim 1, wherein the negative electrode active material comprises a silicon-based active material, artificial graphite, and natural graphite.

10. The negative electrode for a lithium secondary battery of claim 9, wherein the silicon-based active material comprises at least one selected from a group of a silicon oxide, a silicon metal complex, and a silicon carbon composite.

11. The negative electrode for a lithium secondary battery of claim 6, wherein the first negative electrode active material layer comprises at least one of artificial graphite or natural graphite, and a silicon-based active material, and the second negative electrode active material layer comprises at least one of artificial graphite or natural graphite, and a silicon-based active material.

12. The negative electrode for a lithium secondary battery of claim 6, wherein the first negative electrode active material layer comprises at least one of artificial graphite or natural graphite, and the second negative electrode active material layer comprises at least one of artificial graphite or natural graphite, and a silicon-based active material.

13. The negative electrode for a lithium secondary battery of claim 6, wherein the first negative electrode active material layer comprises artificial graphite and natural graphite, and the second negative electrode active material layer comprises natural graphite and a silicon-based active material.

14. The negative electrode for a lithium secondary battery of claim 13, wherein the first negative electrode active material layer further comprises a silicon-based active material.

15. The negative electrode for a lithium secondary battery of claim 1, wherein the negative electrode active material layer comprises from 1 part by weight to 10 parts by weight of a silicon-based active material based on 100 parts by weight of a total of the negative electrode active materials.

16. The negative electrode for a lithium secondary battery of claim 6, wherein at least one layer of the first negative electrode active material layer or the second negative electrode active material layer comprises from 1 part by weight to 20 parts by weight of a silicon-based active material based on 100 parts by weight of a total of the negative electrode active materials of each layer.

17. A lithium secondary battery comprising:
the negative electrode of claim 1;
a positive electrode; and
an electrolyte selected from an organic-based liquid electrolyte, an inorganic-based liquid electrolyte, a solid polymer electrolyte, a gel-type polymer electrolyte, a solid inorganic electrolyte, or a molten-type inorganic electrolyte.

18. The lithium secondary battery of claim 17, further comprising a separator between the negative electrode and the positive electrode.

19. The lithium secondary battery of claim 17, wherein the positive electrode comprises a lithium composite transition metal compound comprising nickel (Ni) and cobalt (Co), as an active material.

20. The lithium secondary battery of claim 19, wherein the lithium composite transition metal compound further comprises at least one of manganese or aluminum.

* * * * *

UNITED STATES PATENT AND TRADEMARK OFFICE
CERTIFICATE OF CORRECTION

PATENT NO. : 12,463,197 B2  
APPLICATION NO. : 19/172807  
DATED : November 4, 2025  
INVENTOR(S) : Shulkee Kim et al.

Page 1 of 1

It is certified that error appears in the above-identified patent and that said Letters Patent is hereby corrected as shown below:

On the Title Page

Under item (30) "Foreign Application Priority Data" the application should be 10-2023-0099052 rather than 10-2023-009952.

Signed and Sealed this  
Ninth Day of December, 2025

John A. Squires  
*Director of the United States Patent and Trademark Office*